United States Patent
Koebler et al.

(10) Patent No.: US 10,227,445 B2
(45) Date of Patent: Mar. 12, 2019

(54) DUAL-CURING SOLVENT-FREE SINGLE-COMPONENT MASSES AND THEIR USE

(71) Applicant: DELO INDUSTRIE KLEBSTOFFE GMBH & CO., KGAA, Windach (DE)

(72) Inventors: Juergen Koebler, Pentenried (DE); Michael Stumbeck, Rosenheim (DE)

(73) Assignee: DELO INDUSTRIE KLEBSTOFFE GMBH & CO. KGAA, Windach (DE)

( * ) Notice: Subject to any disclaimer, the term of this patent is extended or adjusted under 35 U.S.C. 154(b) by 152 days.

(21) Appl. No.: 14/420,409

(22) PCT Filed: Aug. 2, 2013

(86) PCT No.: PCT/EP2013/066302
§ 371 (c)(1),
(2) Date: Jun. 1, 2015

(87) PCT Pub. No.: WO2014/023661
PCT Pub. Date: Feb. 13, 2014

(65) Prior Publication Data
US 2015/0266996 A1    Sep. 24, 2015

(30) Foreign Application Priority Data
Aug. 9, 2012 (DE) .......... 10 2012 015 729

(51) Int. Cl.
| | |
|---|---|
| *C08G 59/40* | (2006.01) |
| *C08G 59/18* | (2006.01) |
| *C08G 59/50* | (2006.01) |
| *C08G 18/58* | (2006.01) |
| *C09D 163/00* | (2006.01) |
| *C09J 163/00* | (2006.01) |

(Continued)

(52) U.S. Cl.
CPC .......... *C08G 59/40* (2013.01); *C08G 18/003* (2013.01); *C08G 18/7831* (2013.01);
(Continued)

(58) Field of Classification Search
CPC ........... C08G 59/40; C08G 59/1477; C08G 18/8175; C08G 18/003; C08G 18/7831;
(Continued)

(56) References Cited

U.S. PATENT DOCUMENTS

| | | | |
|---|---|---|---|
| 4,701,478 A | 10/1987 | Jellinek et al. | |
| 6,949,591 B1* | 9/2005 | Allard .................. | C08J 3/243 427/487 |

(Continued)

FOREIGN PATENT DOCUMENTS

| | | |
|---|---|---|
| DE | 3023486 A1 | 1/1982 |
| DE | 3508450 A1 | 9/1986 |

(Continued)

OTHER PUBLICATIONS https://www.collinsdictionary.com/us/dictionary/english/diluent, p. 1-6 (2017).*

(Continued)

*Primary Examiner* — Jessica M Roswell
(74) *Attorney, Agent, or Firm* — McNees Wallace & Nurick LLC (57) ABSTRACT

The invention relates to a dual-curing solvent-free single-component mass for the bonding, molding, sealing and coating of substrates, in particular of electronic components. The mass comprises an at least bifunctional epoxy-containing compound; a hybrid compound carrying at least one isocyanate group and, at the same time, at least one radically polymerizable group; a latent curing agent based on nitrogen compounds suitable for crosslinking the epoxy-containing compound by addition reaction; a photoinitiator capable of forming radicals when irradiated with light, and optionally other additives. The mass is characterized in that it is surface dry after light curing by means of radical photopolymerization.

16 Claims, 2 Drawing Sheets

Example 1 (comparison)   Example 3   Example 4   Example 5   Example 6 (comparison)

(51) Int. Cl.
  *C08L 63/00* (2006.01)
  *C08G 18/78* (2006.01)
  *C08G 18/81* (2006.01)
  *C08G 18/00* (2006.01)
  *C09D 175/14* (2006.01)
  *C09J 175/14* (2006.01)
  *C08G 59/14* (2006.01)

(52) U.S. Cl.
  CPC ..... *C08G 18/8175* (2013.01); *C08G 59/1477* (2013.01); *C08G 59/18* (2013.01); *C08G 59/4064* (2013.01); *C08G 59/50* (2013.01); *C08L 63/00* (2013.01); *C09D 163/00* (2013.01); *C09D 175/14* (2013.01); *C09J 163/00* (2013.01); *C09J 175/14* (2013.01)

(58) Field of Classification Search
  CPC .... C08G 59/4064; C08G 59/18; C08G 59/50; C09J 175/14; C09J 163/00; C09D 175/14; C09D 163/00; C08L 63/00
  See application file for complete search history.

(56) References Cited

U.S. PATENT DOCUMENTS

| | | | |
|---|---|---|---|
| 7,037,972 B2* | 5/2006 | Nienhaus | C08G 18/6212 522/104 |
| 2004/0039103 A1 | 2/2004 | Nienhaus et al. | |
| 2004/0110864 A1* | 6/2004 | Hecht | C09J 4/00 523/113 |
| 2005/0123768 A1 | 6/2005 | Fischer et al. | |
| 2010/0212830 A1 | 8/2010 | Stumbeck et al. | |
| 2012/0115972 A1 | 5/2012 | Shinano et al. | |

FOREIGN PATENT DOCUMENTS

| | | |
|---|---|---|
| DE | 10048275 C1 | 5/2002 |
| DE | 10357712 A1 | 7/2005 |
| DE | 10 2005 031 381 A1 | 1/2007 |
| DE | 10 2009 012 272 A1 | 9/2010 |
| DE | 102009012272 A1 | 9/2010 |
| DE | 10 2010 010 598 A1 | 9/2011 |
| EP | 1 061 101 A2 | 12/2000 |
| WO | 0013818 | 3/2000 |

OTHER PUBLICATIONS http://www.chemicool.com/definition/dilution.html, p. 1 (2017).*
Wellmann, machine English translation of DE 10-2009-012272 (Sep. 23, 2009).*
DESMOLUX brochure by Allnex (2013), p. 1-12.*
Translated International Preliminary Report on Patentability for International Application No. PCT/EP2013/066302.

* cited by examiner

DUAL-CURING SOLVENT-FREE SINGLE-COMPONENT MASSES AND THEIR USE

FIELD OF THE INVENTION

The present invention relates to epoxy resin-based dual-curing solvent-free single-component masses and their use for the bonding, molding, sealing and coating of substrates. Such masses are versatile and can be used as adhesive and sealing masses for construction purposes, as construction adhesives or as molding and coating masses in the electronics industry.

BACKGROUND OF THE INVENTION

Dual-curing adhesives have been in the center of interest for many years. Usually, curing by means of actinic radiation, in particular in the UV/VIS range, is combined with a second curing mechanism, which might be curing by using heat or moisture.

For example, one application of dual-curing adhesives is the fast fixation of fillet welds prior to the final curing step to keep structural components from shifting. In molding applications the surfaces can be rapidly light-sealed and the components easily handled without leakage of the molding mass. In such applications light curing is primarily a preliminary fixation. Furthermore, there are applications in which only adhesive residues are to be cured by means of a second curing mechanism, e.g. in undercuts not reached by the light.

So far a multitude of dual-curing mechanisms has been known. These mechanisms always comply with a certain type of chemical reactions and are thus subject to the restrictions related to the chemical substance class used.

The oldest type of dual-curing masses is dual-curing acrylate adhesives. As light curing of the acrylate groups is induced by photoinitiators, heat curing is performed using substances such as peroxides forming free radicals when heated. However, with acrylates there is the problem of oxygen inhibition, that is the surfaces remain moist as the growing chains at the surface of the adhesive are terminated by the oxygen radicals present in the air. Although this phenomenon can be avoided technically by inertization, e.g. by curing in a nitrogen atmosphere or by using hard radiation in the UV-B or UV-C range, the technical effort is correspondingly high.

Moreover, acrylate adhesives exhibit extreme shrinkage, poor temperature resistance and moderate moisture resistance. In particular the resistance to a combination of moisture and temperature, often tested in the so-called 85/85 test (85% humidity at 85° C., usually during 1000 hours), is a problem. This is why acrylate adhesives have not been used so far at a large scale, for example, in the electronics industry.

European patent EP 1 061 101 B1 discloses cationically dual-curing masses that are surface dry after curing. Although cationically dual-curing systems have gained some acceptance in the electronics field, for example in the production of smart card modules, the sensitivity of the systems on alkaline substrate surfaces, on which cationic polymerization is inhibited by chain growth termination, prevents a broader application of these masses.

German patent specification DE 10 2009 012 272 B4 describes light-curing acrylate adhesives comprising isocyanate-containing resins whose isocyanate groups are cross-linked via amine clusters in a second curing mechanism. However, it is an object of that patent specification to exclude liquid components in shadow regions. To this end distinctly reduced mechanical properties are accepted.

Dual-curing masses according to DE 10 2010 010 598 A1 also use moisture crosslinking albeit with α-silanes. Although here the mechanical properties of the cured masses are improved as compared to patent specification DE 10 2009 012 272 B4—for example, the mechanical properties will suffice to provide enough stability to shadow regions in bonded displays—the strength of the cured masses is not comparable to the strengths achieved with purely light-curing acrylate adhesives. In addition, these masses have the disadvantages mentioned before and already known with regard to acrylates.

In addition, light-fixable cyanoacrylates, generally known as superglue, and light-fixable silicones are commercially available. Again the disadvantages of the underlying chemistry, e.g. very poor moisture resistance of the cyanoacrylates or moderate adhesion properties of the silicones, prevail.

DE 10 2005 031 381 A1 discloses heat-curing masses in which (iso)cyanates are cured using amine-based latent curing agents. The possibility of mixing with epoxy resins is also described. However, the possibility of curing the masses by means of light is not disclosed.

Patent specification US 2012/0115972 describes a dual-curing system comprising a photoinitiator, an epoxy resin, a latent curing agent for the epoxy resin and a radical-curing resin. When irradiated with light, this system is supposed to result in extensive deep curing. Especially in the use of LCD displays, damage to the LCD display by uncured components in shadow regions is supposed to be avoided by a downstream heat-curing step. Thus, the properties of the dual-curing system correspond to a classic radically light-curing product. This is illustrated by the fact that the radical-curing resin is preferred to be present in a proportion of 40 to 90 percent.

For the general expertise regarding the adhesive systems known in the state of the art reference is made to the book "Formulierung von Kleb- and Dichtstoffen [Formulation of adhesives and sealing agents]" by B. Müller and W. Rath, 2004, published at Vincentz-Verlag Hanover.

Heat-curing single-component epoxy resins have been known to those skilled in the art for several decades. The curing of epoxy resins by using latent curing agents, mostly based on amines, results in masses that have been widely applied in almost all industrial fields due to their low shrinkage, good mechanical properties, chemical resistance and excellent thermal resistance. The properties of epoxy resins are, for example, described in the book "Epoxy Resins, Chemistry and Technology", editor Clayton A. May, published at Marcel Dekker Verlag, New York, $2^{nd}$ edition 1988.

However, functioning dual curing using heat-curing epoxy resins has not been known so far. Although meanwhile so-called "photolatent bases" containing protected amine groups have been described, which are available from the company BASF SE, for complete curing of the epoxy resin the amine would have to be released in a stoichiometric amount as compared to the epoxy groups. In addition, each amine would have to carry two reactive groups, i.e. it would have to be used as a diamine or as a primary amine containing two hydrogen atoms suitable for crosslinking. Thus, the use of these photolatent bases for light curing of epoxy resins is excluded.

In addition, several manufacturers offer so-called epoxy acrylates, that is hybrid compounds carrying both epoxy groups and acrylate groups. However, these epoxy acrylates either result—when the epoxy proportion of the masses is set high—in sticky surfaces after curing in the UV/VIS range or—when the acrylate proportion is set very high—in masses having the disadvantages known with regard to acrylates.

SUMMARY OF THE INVENTION

It is an object of the present invention to provide dual-curing epoxy masses which can be used to achieve the advantages of the known heat-curing epoxy resins and are particularly suitable for application in the electronics field. Preferably, the masses are supposed to provide the possibility of additional curing by means of actinic radiation. Additional curing by means of actinic radiation is supposed to make a preliminary fixation and sealing of the masses' surface possible, while the mass is cured by heat treatment.

According to the present invention, this object is solved by a dual-curing solvent-free single-component mass according to claim 1.

Preferred embodiments of the invention are given in the sub-claims, which may be freely combined with each other.

Further objects of the invention are the use of the dual-curing mass according to claim 1 for the bonding, molding, sealing and coating of substrates, and the components produced by using the mass according to the present invention.

According to the present invention the dual-curing solvent-free single-component mass consists of:
(A) 30 to 60% w/w of an at least bifunctional epoxy-containing compound;
(B) 5 to 35% w/w of a hybrid compound carrying at least one isocyanate group and, at the same time, at least one radically polymerizable group;
(C) 5 to 40% w/w of a latent curing agent based on nitrogen compounds suitable for crosslinking the epoxy-containing compound by addition reaction;
(D) 0.2 to 5% w/w of a photoinitiator capable of forming radicals when irradiated with light, each relative to the entire weight of components (A) to (D); and optionally
(E) 0 to 80% w/w of modifiers selected from at least one of the groups of fillers, dyes, pigments, stabilizers, moisture binding agents, catalysts, flow improvers, wetting agents, thixotropic agents, diluents and polymeric thickeners, each relative to the entire weight of the mass.

The masses according to the present invention are characterized in that they are essentially surface dry after radical photopolymerization by irradiation with light in the UV-A/VIS range from 315 to 800 nm under air prior to heat curing of the masses.

Surface dryness of a mass cured with actinic radiation is controlled by means of the industry-recognized talcum test, which has been defined by the "Arbeitsgemeinschaft Druckveredelung e.V." in its newsletter of May 2010 (responsible for this newsletter: Samuel Moesli, Schmid Rhyner A G, Soodring 23, CH-8134 Adliswil-Zurich) and is freely accessible. Essentially, the test is based on depositing talcum powder on the light-cured surface and subsequently removing it with a cotton swab. If no residues are visible on the surface a system is considered as surface dry.

Surprisingly, it was found that heat-curing epoxy masses can be provided with a dual-curing mechanism by adding a hybrid compound carrying both isocyanate groups and radically polymerizable groups, and a photoinitiator for activating the radically polymerizable groups, to the epoxy masses usually containing an epoxy resin and a latent curing agent.

It is particularly surprising that, contrary to expectations regarding radiation curing of radically polymerizable groups, dry surfaces can be obtained as early as following light curing.

The masses according to the present invention are present in the form of a storage-stable single-component mixture and do not need a second component to be added for curing.

Masses are considered as storage-stable if their viscosity changes by less than 50% at room temperature (23° C.) during the specified storage time. The masses according to the present invention preferably have a storage stability at room temperature of at least 1 week.

The masses according to the present invention are further characterized in that, after light curing in the UV-A or VIS range from 315 to 800 nm under air prior to heat curing of the masses, their surfaces preferably exhibit a storage modulus of at least 25,000 Pa, more preferably of at least 30,000 Pa and particularly preferably of 30,000 to 1,000,000 Pa.

Selecting masses having a suitable storage modulus after light curing results in cured adhesives with almost the same positive properties as epoxy resins classically cured only by heat.

The storage modulus can be influenced both by the proportion of the hybrid compound (component (B)) and the kind of hybrid compound itself, and in particular by the proportion of the radically polymerizable groups in the hybrid compound.

In the masses according to the present invention aliphatic, cycloaliphatic and aromatic epoxy resins and mixtures thereof can be used as epoxy-containing compound with at least two epoxy groups (component (A)). Aliphatic epoxy resins contain components carrying both an aliphatic group and at least two epoxy groups.

Examples of the components of aliphatic epoxy resins are in particular butanediol diglycidyl ether, hexanediol diglycidyl ether, dimethylpentane dioxide, butadiene dioxide and diethyleneglycol diglycidyl ether.

Cycloaliphatic epoxy resins are known in the state of the art and contain components carrying both a cycloaliphatic group and at least two oxirane rings. Exemplary representatives are 3-cyclohexenylmethyl-3-cyclohexyl carboxylate diepoxide, 3,4-epoxycyclohexylalkyl-3',4'-epoxycyclohexane carboxylate, 3,4-epoxy-6-methylcyclohexylmethyl-3',4'-epoxy-6-methylcyclohexane carboxylate, vinylcyclohexane dioxide, bis(3,4-epoxycyclohexylmethyl)adipate, dicyclopentadiene dioxide, 1,2-epoxy-6-(2,3-epoxypropoxy)hexyhydro-4,7-methanindan. The use of 3,4-epoxycyclohexylmethyl-3',4'-epoxycyclohexyl carboxylate is preferred.

Aromatic epoxy resins can also be used in the masses according to the present invention. Examples of aromatic epoxy resins are bisphenol-A epoxy resins, bisphenol-F epoxy resins, epoxy phenol novolac resins, epoxy cresol novolac resins, biphenyl epoxy resins, 4,4'-biphenyl epoxy resins, divinylbenzene dioxide, 2-glycidylphenylglycidyl ether.

In addition, polyfunctional epoxy resins of all three resin groups, viscoelastic epoxy resins and mixtures of various epoxy resins can also be used in the masses according to the present invention.

In the masses according to the present invention component (A) is present in a proportion of 30 to 60% w/w, preferably in a proportion of at least 40% w/w and particularly preferably in a proportion of at least 45% w/w, each relative to the entire weight of components (A) to (D).

The hybrid compounds comprising at least one free isocyanate group and at least one radically radiation-curing group employed as component (B) in the masses according to the present invention are generally known and can be obtained by partial reaction of the isocyanate groups of a molecule carrying at least two isocyanate groups with a compound containing at least one radically radiation-curing group and a hydroxyl group. Depending on the number of isocyanate groups initially present various numbers of radically radiation-curing groups can be incorporated into the hybrid compound. For example, in a molecule with four isocyanate groups, optionally one, two or three of these groups can be converted into radically radiation-curing groups.

Polyfunctional isocyanates used for the generation of the hybrid compound are preferably compounds of the formula $Q(NCO)_n$, with n=2 to 5, preferably 2 or 4, and Q being an aliphatic hydrocarbon residue with 2 to 18, preferably 6 to 10 C atoms, a cycloaliphatic hydrocarbon residue with 4 to 15, preferably 5 to 10 C atoms or an aromatic hydrocarbon residue with 6 to 15, preferably 6 to 13 C atoms.

Exemplary isocyanates of the above-mentioned general formula having several isocyanate groups are low molecular weight isocyanates such as hexamethylene diisocyanate, 1,12-didecane diisocyanate, cyclobutane-1,3-diisocyanate, cyclohexane-1,3- and cyclohexane-1,4-diisocyanate and any mixture of these isomers, 1-isocyanato-3,3,5-trimethyl-5-isocyanatomethylcyclohexane, hexahydro-1,3- and/or hexahydro-1,4-phenylene diisocyanate, perhydro-2,4'- and/or perhydro-4,4'-diphenylmethane diisocyanate, 1,3-phenylene and 1,4-phenylene diisocyanate, 2,4-toluylene and 2,6-toluylene diisocyanate and any mixture of these isomers, diphenylmethane-2,4'- and/or diphenylmethane-4,4'-diisocyanate, naphthylene-1,5-diisocyanate, triphenylmethane-4,4',4"-triisocyanate or polyphenyl polymethylene polyisocyanate as they can be obtained by aniline/formaldehyde condensation and subsequent phosgenation.

Preferably, these low molecular weight isocyanates are made into higher molecular weight isocyanates, i.e. polyfunctional isocyanates with, for example, structural isocyanurate, carbodiimide, allophanate, biuret or uretdion units, according to methods known in the state of the art.

Higher molecular weight isocyanates preferred according to the present invention are in particular the prepolymers with terminal isocyanate groups and a molecular weight ranging from 400 to 10,000, preferably from 600 to 8000 and particularly from 800 to 5000, known from polyurethane chemistry. These higher molecular weight isocyanates are obtained in a known manner by reaction of excessive amounts of the above-mentioned low molecular weight isocyanates with organic compounds containing at least two groups reactive to isocyanate groups, such as organic polyhydroxy compounds.

It is preferred that the radically radiation-curing group in the hybrid compound is an acrylic acid ester, an acrylic acid amide, a methacrylic acid ester, a methacrylic acid amide, a vinyl ether or a bismaleimide. These groups are preferably, but not exclusively incorporated into the hybrid compound by reaction of at least one isocyanate group of the polyfunctional isocyanate with a compound having a hydroxy function in addition to the radiation-curing group.

Hydroxy-functionalized (meth)acrylic acid esters are particularly preferred for reaction with the polyfunctional isocyanate. Such (meth)acrylates comprise, for example, esters of acrylic acid or methacrylic acid with aromatic, aliphatic or cycloaliphatic polyols or with polyether alcohols.

Hydroxybutylacrylate, hydroxyhexylmethacrylate and hydroxybutyl vinyl ether including the mixtures thereof are particularly preferred.

Preferably, the hybrid compound has a degree of reaction of 25 to 75, i.e. 25 to 75% of the free isocyanate groups of the polyfunctional isocyanate used as a starting material for the generation of the hybrid compound are reacted with the hydroxy-functionalized compound carrying the radiation-curing group. Preferably, the degree of reaction is 25 to 60%, more preferably 30 to 55% and particularly preferably 45 to approx. 55%.

In the mass according to the present invention the hybrid compound is preferably present in a proportion of 10 to 30% w/w, particularly preferably in a proportion of 15 to 25% w/w, each relative to the entire weight of components (A) to (D).

In the masses according to the present invention all latent curing agents known to those skilled in the art of single-component epoxy resins are suitable as component (C). In relation to the present invention, those curing agents that remain inactive for a certain period of time under storage conditions, but become active when heated to a temperature typical for heat curing of approx. 60 to 160° C. and cause a polyaddition and crosslinking reaction between the curing agent and the epoxy resin, are considered as "latent curing agents".

Although encapsulated curing agents would also meet this definition, the encapsulating material remains in the mass as an unreactive component and may negatively affect its properties. The same applies to curing agents in which components can be split off that are not incorporated into the cured mass, such as formaldehyde or other protection groups. Therefore, it is another prerequisite for latent curing agents according to the present invention that they melt and/or decompose at a certain temperature, with the decomposition exclusively giving rise to components reactive to the epoxy resins.

Without excluding other latent curing agents for epoxy resins, examples of latent curing agents according to the present invention are dicyandiamide, guanidine derivatives, triazine derivatives, guanamine derivatives, aliphatic amines, cycloaliphatic amines, aromatic amines, polyaminoamines and imidazoles. Further examples of latent curing agents are all polymeric nitrogen-containing compounds if an addition reaction with epoxy resins is possible. Adducts of epoxy resins with various amines are particularly preferred.

Mixtures of various latent curing agents can be used to vary the reaction rate of the curing agent or to adapt the melting point and thus the reaction temperature of the heat curing to the respective requirements.

According to a preferred embodiment of the masses according to the present invention latent curing agents with a melting point below 150° C., more preferably below 110° C. and particularly preferably below 90° C. are used.

The proportion of the curing agent in the mass depends on the equivalents of the curing agents, epoxy resins and isocyanates used, with the curing agent being used either in the respective equivalent or in excess.

The proportion of component (C) in the mass according to the present invention is preferably 20 to 40% w/w, particularly preferably 25 to 40% w/w, each relative to the entire weight of components (A) to (D).

The latent curing agents are offered by the manufacturers in various particle sizes. Particularly preferred according to the present invention are latent curing agents having an average particle size of not more than 10 μm.

As the latent curing agent has the property to react both with the epoxy resins of the masses according to the present invention and the isocyanate groups of the hybrid compound, all components can be cross-linked.

Usual commercially available compounds such as α-hydroxyketone, benzophenone, α,α-diethoxyacetophenone, 4,4-diethylaminobenzophenone, 2,2-dimethoxy-2-phenylacetophenone, 4-isopropylphenyl-2-hydroxy-2-propylketone, 1-hydroxycyclohexylphenylketone, isoamyl-p-dimethylaminobenzoate, methyl-4-dimethylaminobenzoate, methyl-o-benzoin isobutyl ether, 2-hydroxy-2-methyl-1-phenylpropane-1-on, 2-isopropylthioxanthone, dibenzosuberone, 2,4,6-trimethylbenzoyldiphenylphosphine oxide and bisacylphosphine oxide can be used as photoinitiators for radical polymerization (component (D)); the photoinitiators mentioned can be used alone or in combination of two or several of the compounds mentioned.

For example, IRGACURE® types by BASF SE such as IRGACURE® 184, IRGACURE® 500, IRGACURE® 1179, IRGACURE® 2959, IRGACURE® 745, IRGACURE® 651, IRGACURE® 369, IRGACURE® 907, IRGACURE® 1300, IRGACURE® 819, IRGACURE® 819DW, IRGACURE® 2022, IRGACURE® 2100, IRGACURE® 784 und IRGACURE® 250 types can be used as UV photoinitiators. In addition, DAROCUR® types by BASF SE such as DAROCUR® MBF, DAROCUR® 1173, DAROCUR® TPO und DAROCUR® 4265 can be used.

The photoinitiator employed in the masses according to the present invention can preferably be activated by light of a wavelength of 320 to 480 nm.

In the masses according to the present invention fillers such as quartz powder, silicates, glass flour, teflon powder, ceramic powder, metal powder as well as dyes and pigments, for example soots, metal oxides or organic dyes and pigments can be used as modifiers (component (E)).

Stabilizers may serve, on the one hand, to increase storage stability (e.g. slightly acidic compounds such as toluenesulfonyl isocyanate) and, on the other hand, to protect the cured mass from decomposition by heat or UV radiation (e.g. sterically hindered phenols or amines).

Moisture binding agents are also modifiers suitable for increasing storage stability and avoiding carbon dioxide formation.

Imidazoles or urea derivatives such as monurone or diurone can be used as catalysts, but also catalysts known to those skilled in the art of isocyanates such as organotin compounds.

Flow improvers, wetting agents, diluents and thickening agents as well as thixotropic agents known to those skilled in the art can be used to control flow behavior. Combinations of these agents with one another and combinations with other modifiers corresponding to application-specific requirements can be used.

Surprisingly, it could be found that the surfaces of the masses according to the present invention are dry after light curing, although radical polymerization is performed during curing with light in the UV-A/VIS range. In the masses according to the present invention the surface dryness can be correlated with the storage modulus. This is also surprising as the proportion of radically polymerizable groups in the masses according to the present invention is very low.

The storage modulus is determined by means of a rheometer and considered to be a measure for the deformation energy stored during a shearing process. After a relief this energy is again completely available for re-deformation. Thus, the storage modulus is also a measure for the degree of crosslinking of a system. If a liquid mass is cured by polymerization, its storage modulus increases by several decimal powers. The more cross-linked a system is, the higher is its storage modulus.

Surprisingly, the masses according to the present invention show a good correlation between storage modulus and surface dryness. If a sufficiently thin layer of the mass according to the present invention is pre-cured with light and too soft, this indicates an insufficient incorporation or an insufficient crosslinking of the liquid components. The surface is then sticky and the storage modulus comparably low.

According to the present invention the storage modulus of the masses according to the present invention after light curing in the UV-A/VIS range under air is preferably at least 25,000 Pa, particularly preferably at least 30,000 Pa.

If the crosslinking of the groups radically polymerized by light curing is too close and the storage modulus is too high, the latent curing agent, conversely, can insufficiently melt and/or distribute in the matrix during subsequent heat curing with the result that neither the isocyanate groups of the hybrid compound nor the epoxy groups react with the curing agent. Thus, the desired network is not obtained and in particular the properties of aminically cross-linked epoxy resins desired for the masses according to the present invention would not have any effect in the area essentially cured by irradiation with light.

Thus, according to the present invention, the storage modulus of the masses according to the present invention after light curing in the UV-A/VIS range under air is preferably not more than 1 MPa.

The masses according to the present invention are cured by exposure to light in the UV-A/VIS range from approx. 315 to 880 nm, preferably to light of a wavelength of 320 to 480 nm. Radiation curing is followed by heat curing at temperatures between 80 and 180° C. Temperatures below 150° C. are particularly preferred.

The duration of heat curing is preferably 1 hour at 80° C. to 10 minutes at 150° C., particularly preferably to 5 minutes at 180° C. The curing times mentioned relate to curing in convection furnaces. Alternative curing methods such as IR emitters or thermode curing (thermo-compression) can considerably shorten curing times.

After heat curing, the masses according to the present invention exhibit mechanical properties deviating only marginally from the parameters of the initially underlying epoxy resin masses exclusively heat-cured by use of aminic curing agents. Thus, according to the present invention, dual curing is feasible in which the masses after curing with light exhibit dry surfaces and, at the same time, achieve the excellent mechanical properties of aminically heat-curing epoxy resin masses after final heat curing.

The masses according to the present invention are especially suitable as adhesives, molding masses and for sealing or coating of substrates. The masses are particularly suitable for use in production processes in which rapid initial fixation by means of a light curing step is to be achieved. These can be assembly steps for components such as miniature loudspeakers, camera modules and other electrical components. In molding applications the surfaces of the masses according to the present invention can be rapidly sealed by light curing and the components can be immediately passed on to another processing step.

Therefore, another object of the invention is the use of the masses according to the present invention for the bonding, molding, sealing and coating of substrates, and the components produced by using these masses. The masses according to the present invention are preferably used in electrical and electronic components.

DESCRIPTION OF THE DRAWINGS

Although further features of the invention are evident from the following description of preferred embodiments in relation with the attached drawing, the embodiments are not to be understood as limiting. In the drawings

DESCRIPTION OF PREFERRED EMBODIMENTS

If not stated otherwise, all percentages in the compositions of the embodiments relate to weight percent.

Depending on the embodiment the following properties were determined and summarized in Table 1.

Surface Dryness

The mass was placed on a slide and cured with an UV-A/VIS lamp (mercury gas discharge lamp) for 30 seconds with an intensity of 60 mW/cm$^2$ at room temperature (23° C.). The surface was sprinkled with talcum powder and the powder distributed with a brush. Then, the talcum was wiped off with a cotton swab. The amount of talcum powder remaining on the surface was determined visually. Talcum powder remaining on the surface indicates that the surface is not dry but still sticky. The more talcum powder adheres, the less surface dry is the system.

Determination of Light-curable Layer Thickness

The mass was placed in a mold with a diameter of 2 cm and a height of 5 mm and cured with an UV-A/VIS lamp (mercury gas discharge lamp) for 30 seconds with an intensity of 60 mW/cm$^2$. Subsequently, the cured skin is peeled off and the layer thickness determined using a micrometer screw.

Cohesion and Elongation at Break

The masses were molded into shouldered bars of a defined size (dimensions: 25×5.5×2 mm, measurement section: 10×2×2 mm) and initially cured with an UV-A/VIS lamp (mercury gas discharge lamp) for 30 seconds with an intensity of 60 mW/cm$^2$. Subsequently, they were heat-cured for 30 minutes at 100° C. The shouldered bars were drawn apart at a rate of 30 mm/min in a tensile test machine of the company Zwick, and the cohesion and elongation at break were determined according to DIN EN ISO 527.

Compression Shear Strength Aluminum/Aluminum

Two aluminum specimens at a time (20×20 mm, 5 mm thick) were bonded together with an overlap of 5 mm by using the respective mass. While cured, the specimens were fastened by tubing clamps. The thickness of the adhesive layer was set by inserting two parallel distance wires with a diameter of 0.1 mm. The mass was cured as described in "Cohesion and elongation at break", with light curing occurring only at the fillet welds of the bond. The bond was in turn subjected to destructive testing in a Zwick test machine, and the force at bond failure was recorded.

Storage Modulus

A rheometer (Physica MCR301, RHEOPLUS/32 V3.31, company Paar) including a radiation curing mechanism served as a measuring device. The mass applied on a glass specimen with a layer thickness of 100 μm was cured from below with an UV-A/VIS lamp (mercury gas discharge lamp with fiber optics) under a normal atmosphere with an intensity of 60 mW/cm$^2$. A measuring pin (PP09, i.e. a plate with a diameter of 9 mm) rested on the mass from above. Measurement was performed at 23° C. with the pre-selected deformation (amplitude equal to 10%, frequency: 1 Hertz). 10 seconds after the beginning of the measurement the lamp was switched on and the mass cured. During light curing the course of the storage modulus was monitored. After approx. 70 seconds measurement was terminated. A storage modulus between 40 and 60 seconds was evaluated. 10 seconds of waiting time plus 30 seconds of curing time correspond to the curing state as described in the other measurements.

EXAMPLE 1 (COMPARATIVE EXAMPLE)

A dual-curing acrylate adhesive according to the state of the art essentially comprising radically polymerizable resins (acrylates) and initiators for radical heat and light curing were produced from the below-mentioned components:

40.0% urethane acrylate BR543 from Bomar
10.0% acrylic acid
30.0% isobornyl acrylate
10.0% dimethyl acrylamide
2.5% Peroxan™ BP50+ (dibenzoyl peroxide) from Pergan
2.5% Irgacure™ 184 from BASF
5.0% thixotropic agent (Cab-O-Sil™ M5 from Cabot).

Figure 1:
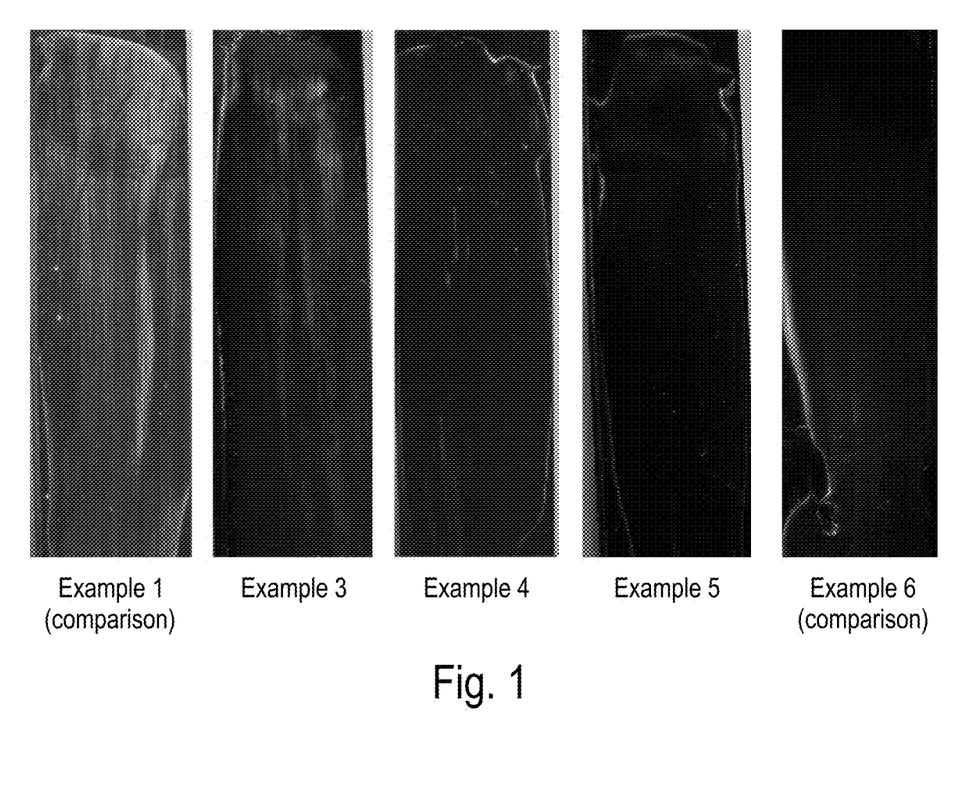
FIG. 1 shows photographs explaining the surface dryness by adhesion of talcum powder. The figure on the left side shows a known acrylate mass according to Example 1, the other figures show the masses according to Examples 3 to 6.
Figure 2:
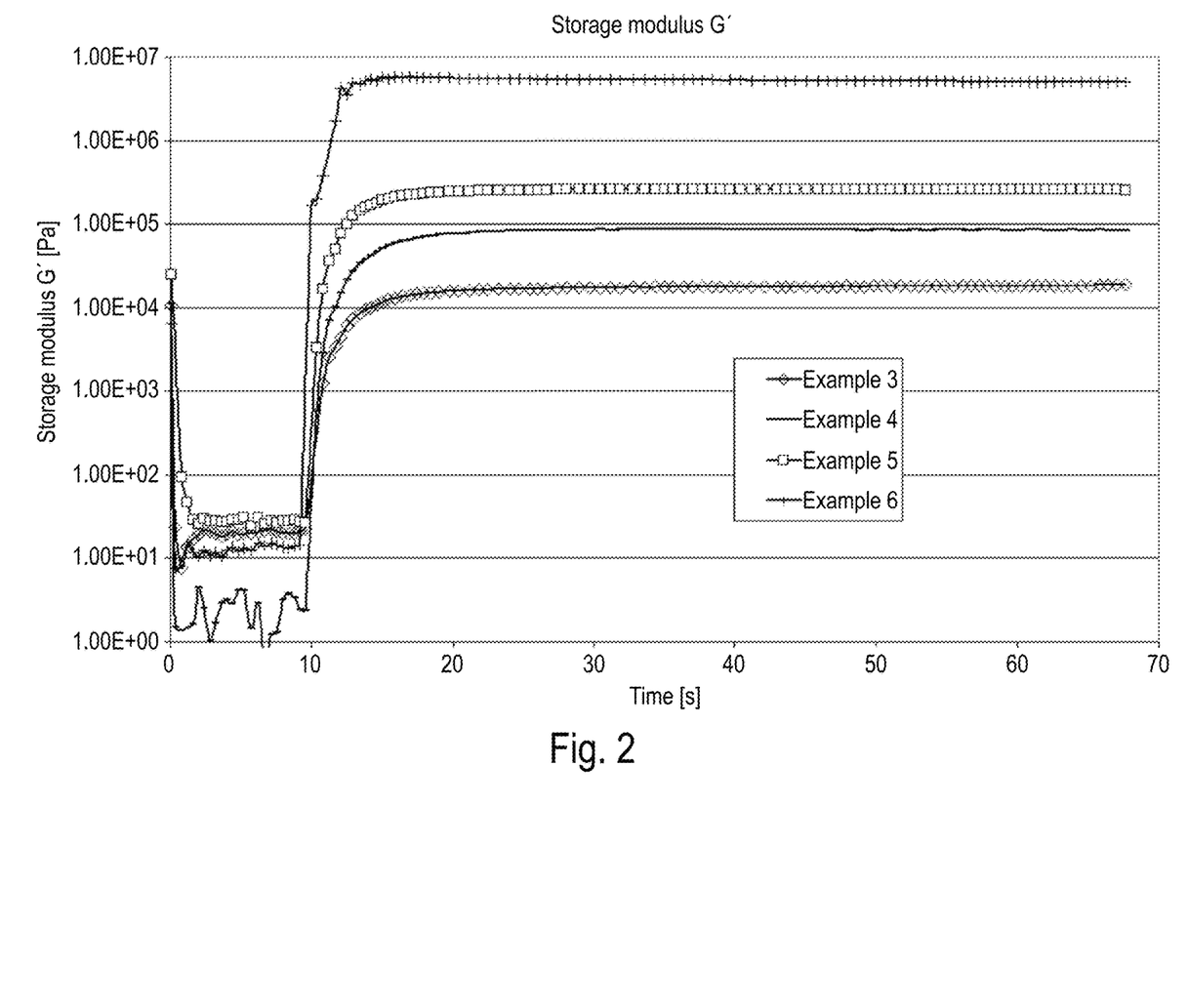
FIG. 2 shows rheometer graphs to determine the storage modulus for Examples 3 to 6.

Measurement of the surface dryness confirms that acrylate-based dual-curing masses exhibit moist and thus sticky surfaces after light curing (left-side figure in FIG. 1).

EXAMPLE 2 (COMPARATIVE EXAMPLE)

A heat-curing mass made of an epoxy resin and a latent curing agent corresponding to the state of the art was produced as another comparative example. The mass comprised the following components:

66% mixture of bisphenol-A and bisphenol-F epoxy resins (EPR166 from Bakelit)
33.0% latent aminic curing agent (Ajicure™ PN-23 from Ajinomoto)
1.0% thixotropic agent (Cab-O-Sil™ M5 from Cabot)

EXAMPLE 3

The following components were mixed and homogenized to produce a dual-curing epoxy resin:

51.5% bisphenol-A epoxy resin (Araldite™ GY250 from Huntsman)
20.3% hybrid compound (Laromer™ LR9000 from BASF)
1.3% photoinitiator (CGI 403™ from BASF)
26.0% latent curing agent (EH-4360S™ from Adeka)
1.2% thixotropic agent (HDK H18™ from Wacker)

This example shows that the surface of the mass after light curing at a low storage modulus of approx. 25,000 Pa is substantially dry. Even if there remain some residues in the talcum test, the surface dryness of the mass can already be regarded as satisfactory for some applications. The mechanical properties of the mass (cohesion, elongation at break and compression shear strength) are similar to the properties of the known heat-curing epoxy resins according to Example 2 (see Table 1).

EXAMPLE 4

The following components were mixed and homogenized to produce a dual-curing epoxy resin according to the present invention:

55.5% bisphenol-A/F epoxy resin (POLYPDX™ E237 from Dow Chemicals)
5.0% hybrid compound (Laromer™ LR9000 from BASF)
15.0% hybrid compound according to the below manufacturing specification
1.5% photoinitiator (Irgacure™ 184 from BASF)
22.0% latent curing agent (EH-4357S™ from Adeka)
1.0% thixotropic agent (Cab-O-Sil™ M5 from Cabot)

To produce the hybrid compound used in this example, 0.05 g 2,6-di-tert-butyl-4-methylphenol and 0.05 g hydroquinone monomethyl ether were added to 110 g of an aliphatic polyisocyanate (Vestanat™ HB 2640/LV from Evonik, NCI content: 23%) at room temperature while stirring. Thereafter, 29 g 4-hydroxybutyl acrylate was added in drops. After the addition was completed, 0.01 g dibutyltin dilaurate was added in drops while stirring and the temperature was increased to 45° C. for 3 hours. The degree of reaction of the isocyanate groups was about 50%.

This example shows that masses according to the present invention with a storage modulus of approx. 90,000 Pa exhibit completely dry surfaces after light curing. The example further shows that the storage modulus can be set via both the proportion of the hybrid compound in the mass according to the present invention and the selection of the hybrid compound itself.

In this embodiment the layer thickness of the light-cured mass is even thinner as compared to the other embodiments, which shows that there is no compelling correlation between curing depth and surface dryness.

The mechanical properties of the cured mass (cohesion, elongation at break and compression shear strengths) are comparable to the properties of the heat-curing epoxy composition of Example 2 (see Table 1).

EXAMPLE 5

The following components were mixed and homogenized to produce a dual-curing epoxy resin according to the present invention:
50.5% bisphenol-A epoxy resin (Araldite™ GY250 from Huntsman)
25.0% hybrid compound according to the manufacturing specification of Example 4
1.5% photoinitiator (Lucirin™ TPO from BASF)
22.0% latent curing agent (Ajicure™ PN-23 from Ajinomoto)
1.0% thixotropic agent (HDK H18™ from Wacker)

This example shows that the masses according to the present invention with a high storage modulus of approx. 0.3 MPa exhibit completely dry surfaces while being further cured by heat curing. The mechanical properties of the mass after heat curing (cohesion, elongation at break and compression shear strength) are comparable to the properties of the heat-cured epoxy resin according to Example 2 (see Table 1).

EXAMPLE 6

The following components were mixed and homogenized to produce another dual-curing epoxy resin:
20.5% bisphenol-A epoxy resin (Araldite™ GY250 from Huntsman)
40.5% hybrid compound (Laromer™ LR9000 from BASF)
2.0% photoinitiator (CGI™ 43 from BASF)
36.0% latent curing agent (EH-4360S™ from Adeka)
1.0% thixotropic agent (HDK™ H18 from Wacker)

Although the mass obtained this way exhibits a perfectly dry surface after light curing, the mechanical properties (cohesion, elongation at break and compression shear strengths) of the heat-cured mass are no longer sufficient and clearly deteriorated as compared to the parameters of the epoxy resin according to Example 2 (see Table 1).

Due to the high proportion of the hybrid compound the mass exhibits a storage modulus of about 5 MPa after light curing. Thus, the distribution of the latent curing agent in the polymer matrix is no longer sufficient for heat curing, and curing remains incomplete.

TABLE 1

Properties of the embodiments

| Example No. | Surface dryness | Layer thickness [µm] | Storage modulus [Pa] |
| --- | --- | --- | --- |
| 1 (comparison) | very poor | 1000 | n.d. |
| 2 (comparison) | n.d. | n.d. | n.d. |
| 3 | satisfactory | 850 | 25,000 |
| 4 | very good | 580 | 90,000 |
| 5 | very good | 1000 | $0.3 \times 10^6$ |
| 6 (comparison) | very good | 1500 | $5 \times 10^6$ |

| Example No. | Cohesion [MPa] | Elongation at break [%] | Compression shear strength Al/Al [MPa] |
| --- | --- | --- | --- |
| 1 (comparison) | n.d. | n.d. | n.d. |
| 2 (comparison) | 37 | 8 | 32.8 |
| 3 | 31 | 10 | 28.1 |
| 4 | 32 | 9 | 27.3 |
| 5 | 30 | 9 | 29.0 |
| 6 (comparison) | 15 | 25 | 8.5 |

The table shows that the acrylate mass according to Example 1 exhibits a very poor surface dryness after light curing, while the surface dryness of Examples 4 and 5 according to the present invention is very good. These examples also show that the mechanical properties (cohesion, elongation at break and compression shear strength) of the mass cured by heat treating is comparable to the properties of the epoxy resin composition according to Example 2 that was only heat-curable.

Although the mass according to Example 3 exhibits good mechanical properties after light curing, its surface dryness is deteriorated as compared to the masses of Examples 4 and 5.

Although the mass according to Example 6 exhibits a very good surface dryness, cohesion, elongation at break and compression shear strength are clearly deteriorated as compared to the epoxy mass according to Example 2.

What is claimed:
1. A dual-curing single-component mass, consisting of:
(A) 30 to 60% w/w of an at least bifunctional epoxy-containing compound;
(B) 5 to 35% w/w of a hybrid compound carrying at least one isocyanate group and, at the same time, at least one radically polymerizable group;
(C) 5 to 40% w/w of a latent curing agent based on nitrogen compounds crosslinkable with the epoxy-containing compound by addition reaction;
(D) 0.2 to 5% w/w of a photoinitiator, wherein the photoinitiator forms radicals when irradiated with light, each relative to the entire weight of components (A) to (D); and optionally
(E) 0 to 80% w/w of modifiers selected from at least one of the groups of fillers, dyes, pigments, stabilizers, moisture binding agents, wetting agents, and thixotropic agents, each relative to the entire weight of the mass;

wherein the dual-curing single-component mass is solvent-free.

2. The mass according to claim 1 wherein the mass is surface dry after radical photopolymerization by irradiation with light in the UV-A/VIS range under air.

3. The mass according to claim 1 wherein the mass exhibits a storage modulus of at least 25,000 Pa after irradiation with light in the UV-A/VIS range.

4. The mass according to claim 3 wherein the storage modulus is in a range of from 30,000 Pa to 1 MPa.

5. The mass according to claim 1 wherein the hybrid compound is a reaction product of at least one bifunctional isocyanate and a hydroxy-functional compound carrying at least one radically polymerizable group.

6. The mass according to claim 5, wherein the at least one bifunctional isocyanate has isocyanate groups, and wherein 25 to 75% of the isocyanate groups are reacted with the hydroxy-functional compound.

7. The mass according to claim 1 wherein the mass has a storage stability at room temperature of at least 1 week.

8. The mass according to claim 1 wherein the photoinitiator is activated by irradiation with light of a wavelength of 320 to 480 nm.

9. The mass according to claim 1 wherein the radically polymerizable groups of the hybrid compound are selected from the group of (meth)acrylates.

10. The mass according to claim 1 wherein the radically polymerizable groups of the hybrid compound are selected from the group of vinyl ethers.

11. The mass according to claim 1 wherein the hybrid compound is derived from a prepolymer having terminal isocyanate groups, with the prepolymer having an average molecular weight in the range of 400 to 10,000.

12. The mass according to claim 1 wherein the latent curing agent has an average particle size of not more than 10 µm.

13. The mass according to claim 1 wherein the mass is configured for use for the bonding, molding, sealing and coating of substrates.

14. The mass according to claim 13 wherein the substrate is an electrical or electronic component.

15. The mass according to claim 1 wherein the mass is curable in a convection furnace at a temperature of at most 150° C.

16. A component comprising a mass according to claim 1, wherein the mass is cured by exposure to light in the UV-A/VIS range and subsequent heating to a temperature of 80 to 180° C.

* * * * *